No. 888,165. PATENTED MAY 19, 1908.
T. H. HARRINGTON.
HOSE COUPLING.
APPLICATION FILED JUNE 11, 1907.

Witnesses
J. T. L. Wright
J. W. Garner

Inventor
Thomas H. Harrington
By Victor J. Evans
Attorney

UNITED STATES PATENT OFFICE.

THOMAS H. HARRINGTON, OF WILMOT, ARKANSAS.

HOSE-COUPLING.

No. 888,165.

Specification of Letters Patent.

Patented May 19, 1908.

Application filed June 11, 1907. Serial No. 378,425.

*To all whom it may concern:*

Be it known that I, THOMAS H. HARRINGTON, a citizen of the United States of America, residing at Wilmot, in the county of Ashley and State of Arkansas, have invented new and useful Improvements in Hose-Couplings, of which the following is a specification.

This invention relates to improvements in hose couplings especially adapted for use in connection with fire hose to enable lengths of such hose to be instantly coupled together, and the said invention consists in the construction, combination and arrangement of devices hereinafter described and claimed.

Figure 1:
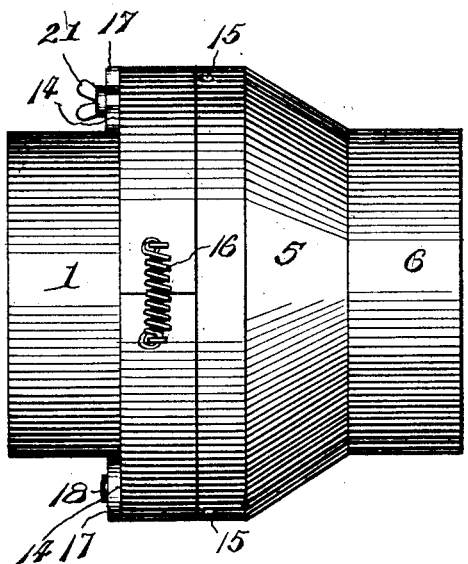
Figure 2:
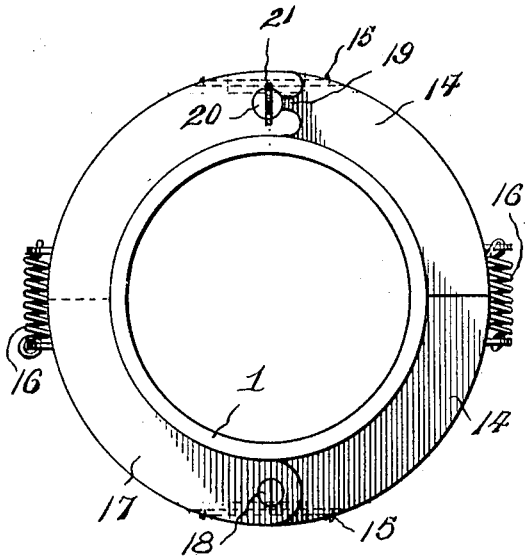
Figure 3:
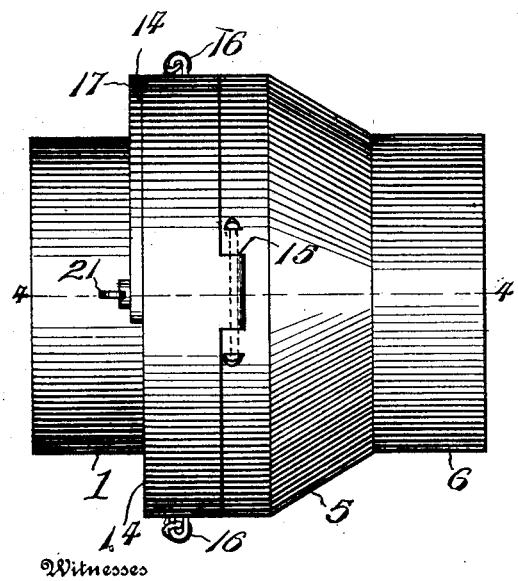
Figure 4:
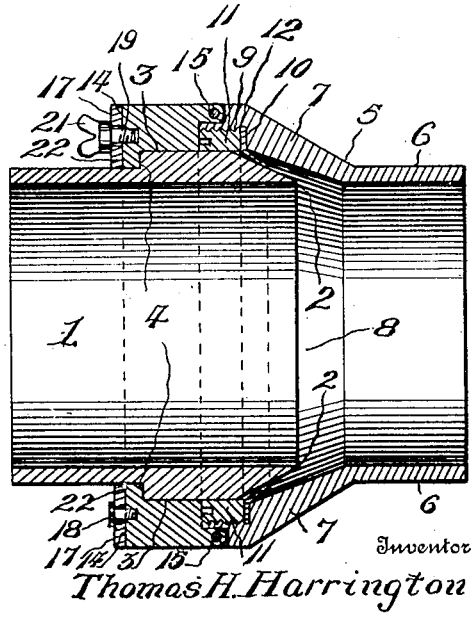

In the accompanying drawing,—Figure 1 is a side elevation of a hose coupling constructed in accordance with this invention. Fig. 2 is an end elevation of the same. Fig. 3 is a side elevation, showing another side than that shown in Fig. 1. Fig. 4 is a longitudinal sectional view of the same.

The member 1 of my improved coupling is tubular in form, adapted to have a length of hose secured on one end thereof, and the opposite end, which I will term the outer end, is beveled on its outer side, as at 2, so that the outer end of the said member is tapering in form, and the said bevel 2 constitutes a cam surface for the purpose hereinafter stated. The outer portion of the member 1 is provided with an annular circumferential enlargement 3 provided with an annular circumferential shoulder 4.

The member 5 of the coupling has a tubular inner end portion 6 which corresponds in diameter with the inner end portion of the member 1 and is likewise adapted to have one end of a section of hose secured thereon. The outer portion of such member 5 is flared outwardly, as at 7, to provide an inwardly tapering socket 8 for the reception of the head or shouldered outer end of the member 1. The said outer end portion of the member 5 is provided in its inner side with an annular circumferential recess 9 which is screwthreaded and provides an annular shoulder 10. An annular nut 11 is screwed in and nearly fills such recess and serves to press the outer edge of a packing annulus 12 against such shoulder 10 so as to secure such packing annulus in the socket end of the member 5. The inner portion of such packing annulus, which may be made of leather, rubber fabric or other suitable material and which is of substantially truncated conical form, bears on the beveled end surface of the member 1 to effect a tight packing between such member 1 and the member 5.

In connection with the socket member 2 I employ a locking ring which comprises a plurality of segmental sections 14 that constitute the several jaws of such locking ring and each of which is pivotally connected to such socket member 5, as at 15, so that the said jaws or segments of the locking ring may close on the enlarged head portion of the member 1 and against the shoulder 4 thereof, as shown in Fig. 4. The said jaw members or segments of the locking ring are connected together by springs 16 which serve to hold them normally in closed position on the said enlarged head portion of said member 1 and against the shoulder 4 thereof, and yet permit such hinged or pivotally mounted ring segments or jaw members to be turned to enable them to clear such shoulder 4 and enlarged head portion of the member 1 and thereby permit the latter to be withdrawn and uncoupled from the member 5.

To lock the locking ring sections of jaw members together when they are closed on the member 1 of the coupling and prevent them from casually releasing such member 1 provide a curved arm 17 which is here shown as semi-circular in form, but which may be of any suitable shape. The same is pivotally connected to one of the locking ring segments or jaws 14 at one end, as at 18, and is of such length as to extend across the joint between said locking ring segments or jaws and to lie upon the other of such segments or jaws and is provided at its free end with an open slot 19 to be engaged by a set screw 20 carried by the last mentioned locking ring segment or jaw and provided with a ring head 21 to enable it to be readily manually turned.

The operation of this improved coupling is as follows: Assuming that the locking arm 17 has been swung outwardly so as to disconnect the segments or jaws of the locking ring, such segments or jaws are caused when the member 1 is inserted in the socket end of the member 5 to pass over the bevel or cam surface at the outer end of such member 1 and to be spread apart, against the tension of their springs 15 by such bevel or cam surface. As the said member 1 is pressed into the member 5 far enough to enable the flanges 22 of the said locking ring segments or jaws 14 to clear the shoulder 4, such locking ring segments or jaws are closed by the action of the spring 16 instantly against such member 1 and the shoulder 4 thereof, thus preventing the member 1 from being withdrawn and effecting a coupling between such members. The locking arm 17 is then disposed in the position shown in Fig. 2 so as to partly overlap the locking ring segments or jaws and cross the joint between them, and is securely held in such position by the set screw 20, as hereinbefore indicated.

It will be apparent from the foregoing that the members of my improved coupling may be securely fastened together in an exceedingly short space of time so that practically no time will be lost in coupling the lengths of hose together at a fire.

Having thus described the invention, what is claimed as new, is:—

1. In a hose coupling, the combination of a member having an annular circumferential shoulder, a socket member to receive one end of the first-mentioned member, segment jaws hinged to the socket member to close on the first-mentioned member and against the shoulder thereof, and locking means carried by one of said segment jaws and detachably connected to the other to secure such segment jaws together.

2. In a hose coupling, the combination of a member having an annular circumferential shoulder, a socket member to receive one end of the first mentioned member, segment jaws hinged to said socket member to close on the first-mentioned member and against the shoulder thereof, a curved locking arm pivotally connected to one of said segment jaws and means to detachably secure said locking arm to the other of said segment jaws.

In testimony whereof, I affix my signature in presence of two witnesses.

THOMAS H. HARRINGTON.

Witnesses:
R. W. OWENS,
HAWKINS NIEL.